June 7, 1938. S. B. HEATH ET AL 2,120,218
IODINE RECOVERY
Filed March 12, 1937
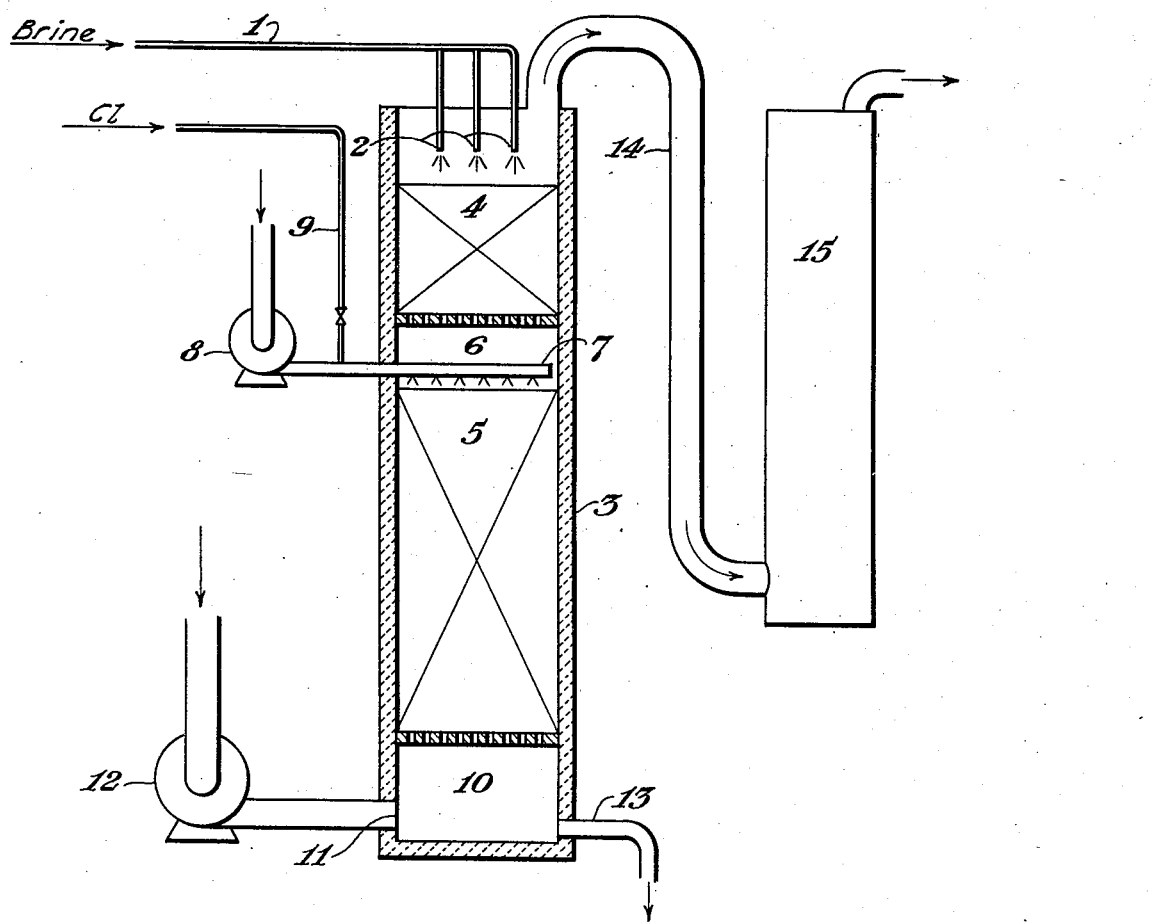
INVENTORS
Sheldon B. Heath
Frank A. Landee
BY Griswold & Burdick
ATTORNEYS Patented June 7, 1938

2,120,218

UNITED STATES PATENT OFFICE 2,120,218

IODINE RECOVERY

Sheldon B. Heath and Frank A. Landee, Midland, Mich., assignors to The Dow Chemical Company, Midland, Mich., a corporation of Michigan Application March 12, 1937, Serial No. 130,487

12 Claims. (Cl. 23—217)

The present invention relates to methods for extracting and recovering iodine from natural brines and the like. A well known method of recovering iodine from alkaline brines, such as oil field brines, consists in acidifying the brine, oxidizing to liberate iodine in the elemental state, vaporizing and blowing out the iodine by means of a current of air, and separating the iodine vapors from the air stream by absorption with an agent capable of dissolving or combining with iodine. This invention is more particularly concerned with improvements in the oxidation and blowing-out steps, whereby higher recoveries of iodine are obtained and important economies in the consumption of materials are realized.

The various oil field brines, which are sources for the commercial production of iodine, have an extremely small iodine content, usually on the order of from 50 to 150 parts per million. In the extraction methods hitherto employed it has been thought necessary to acidify the brine to a relatively high degree in order to insure good results in the oxidizing and blowing-out steps, and hence to avoid excessive losses of unrecovered iodine in the waste liquors. According to usual commercial practice the brine is acidified to a pH value of about 2.5 or lower, which necessitates a large consumption of acid on account of the enormous volumes of brine processed to secure a commercially important output of iodine. Even at such degree of acidification the loss of iodine in the tail liquors under most economical operating conditions has been appreciable, at times amounting to as much as 10 or 15 per cent of the total iodine content of the raw brine. It is an object of this invention to reduce the consumption of acid in a process of the character in hand, and at the same time to increase the recovery of iodine.

The relatively high degree of acidification of the brine employed heretofore was thought necessary for repressing side reactions which tend to occur in aqueous solutions containing free iodine and thereby cause losses in the recovery process. These side reactions convert the free iodine to water soluble compounds which cannot be vaporized and blown out by a current of air in the manner that iodine itself is removed from the solution. Hence the water soluble iodine compounds formed by side reactions remain in the brine and are lost in the waste liquors from the process.

One source of loss is due to the hydrolysis of free iodine in the presence of a large volume of water, according to the equation;—

$$3I_2 + 3H_2O \rightleftharpoons 5HI + HIO_3$$

Such hydrolysis can be suppressed, or the reaction reversed, by acidifying the solution to a sufficient degree. At the concentrations of iodine normally found in processing natural brines a degree of acidity represented by a pH value of 2.5 or lower is required to prevent substantially the hydrolysis of free iodine to water soluble compounds. We have found, however, that the hydrolysis requires an appreciable time to proceed to any considerable degree. Consequently, if the iodine can be immediately removed from the aqueous solution after having been liberated therein, little or no loss by hydrolysis can occur, even though the acidity of the solution would not otherwise be sufficient to prevent the hydrolysis, if sufficient time were allowed.

A further and more serious cause of loss in the process is over-oxidation in connection with the liberation of free iodine. The usual method of oxidizing the brine to liberate the iodine consists in adding chlorine, an excess over theoretical amount being used, such as has been found necessary to secure the highest possible liberation of iodine and removal thereof from the brine in the blowing-out step. Such excess may be on the order of from 20 to 50 per cent, a greater excess being required for low iodine concentrations than for higher concentrations thereof. For the purpose a relatively strong chlorine gas is commonly employed, which is dispersed in the brine as thoroughly as possible by mechanical means. We have found, however, that it is not practicable, in using a fairly strong chlorine gas, to obtain a sufficient degree of dispersion thereof in the brine quickly enough to prevent some over-oxidation, caused by temporary localized high concentration of chlorine. Thereby some of the free iodine is converted to non-vaporizable soluble iodic acid, according to the equation;

$$I_2 + 5Cl_2 + 6H_2O \rightarrow 2HIO_3 + 10HCl$$

Whatever iodic acid is formed in this way is a loss to the process, since it cannot be blown out with air and remains in the tail liquors. Such over-oxidation can be suppressed by having the brine sufficiently acid, but this again requires a relatively high degree of acidification, apparently even higher than that necessary to prevent hydrolysis.

We have been able to reduce greatly such losses of iodine by using a highly dilute mixture of chlorine with air, instead of strong chlorine, for oxidizing the brine. The degree of dilution desired is on the order of 1 volume of chlorine to between about 1000 and 100,000 volumes of air.

We prefer to use an air-chlorine mixture in which the ratio of chlorine to air is comparable to that of iodine to air in the exit gases from the blowing-out step, i. e. 1 volume of chlorine to from about 8,000 to as much as 40,000 volumes of air. When such extremely dilute chlorine-air mixture is used, we have found that iodine can actually be liberated quantitatively in a neutral or slightly alkaline brine having a pH value below about 7.5, and with less loss by over-oxidation than formerly occurred when using strong chlorine in a brine acidified to a pH value of 2.5 or lower.

An effective way in which to utilize a highly dilute chlorine-air mixture for oxidizing an iodiferous brine, we have found, is by adding the chlorine in measured amount to the air employed to blow out the liberated iodine, thus performing the steps of oxidation and blowing out concurrently. By our modified procedure we have succeeded in materially reducing the losses of iodine in a blowing-out process, while at the same time saving much of the acid formerly required to acidify the brine. Our invention, then, consists in the improved method or process, which is described in the accompanying drawing and following specification, and particularly pointed out in the claims.

In the drawing:—

The single figure is a diagrammatic representation of a form of apparatus adapted for carrying out the method of the invention.

According to the invention, an iodiferous brine is treated with a mineral acid, e. g. hydrochloric or sulphuric acid, if necessary, to reduce the pH value to 7.5 or below, preferably to a value of about 5 to 6. The brine is then brought intimately into contact with a voluminous current of air to which has been added a minute volumetric proportion of chlorine in regulated amount sufficient for quantitative liberation of the iodine. The proportion of chlorine in the air stream will vary in proportion to the iodine content of the brine and the volume of air required to vaporize it, but will normally be in the range from about 0.010 per cent to 0.003 per cent by volume. The chlorine in the air stream on intermingling with the brine dissolves readily without creating any local high concentration therein and liberates the iodine, which is simultaneously vaporized to a large extent and carried away by the air stream. The iodine vapors may be recovered from the air stream in any of the various way known to the art.

Since the simultaneous liberation and vaporization of iodine in the above described manner does not remove all of the iodine from the oxidized brine within the normal time interval of contact of the brine and chlorine-air stream in the oxidizing zone, the brine is subjected to a further air-blowing treatment to vaporize the residual iodine contained in it. The air employed for such secondary air-blowing stage may be the same as that which is employed in the oxidizing step, but prior to the addition of chlorine thereto. In this way the use of excessive volumes of air is avoided, so that the total volume of air employed in the present process need not exceed that used in the conventional blowing-out process.

A preferred manner in which the aforesaid two-stage blowing-out process may be carried out is shown illustratively by reference to the drawing. The brine having a suitable hydrogen ion concentration is led by pipe 1 to a distributor or series of nozzles 2 at the top of a tower 3. The interior of tower 3 is divided into two sections or zones 4 and 5, each filled with suitable packing material, and separated from each other by an intermediate open space 6. In space 6 is an inlet pipe 7 for a mixture of air and chlorine, which is provided with a series of outlets, preferably facing downwardly, as shown. Pipe 7 is connected to a fan or blower 8, and has a side inlet pipe 9 for introducing chlorine. In the base 10 of tower 3 is an air inlet 11 connected to blower 12, and a discharge outlet 13 for waste brine. From the top of tower 3 a conduit 14 serves to conduct the exit gases to an absorber 15 of conventional type.

The incoming brine is distributed by nozzles 2 over the body of packing in zone 4, where it is caused to flow in countercurrent to, and is intimately contacted with, the rising current of air introduced by blowers 8 and 12. A minor proportion of the air is supplied by blower 8, and into such air chlorine is admitted to form, say, a 1/1000 chlorine-air mixture. The rate of chlorine introduction is regulated in accordance with the flow of brine in pipe 1, so that the amount of chlorine used is slightly in excess of theoretical proportion to the iodine in the brine. In zone 4 the iodine is liberated in the brine by the action of the chlorine, and to a large degree is simultaneously vaporized and carried away with the air stream. The oxidized and partially de-iodinated brine from zone 4 flows down into zone 5, wherein it is contacted with the air introduced at the base of the tower by blower 12, which vaporizes and removes the remainder of the free iodine from the brine, the exhausted brine flowing to waste through outlet 13. The iodine-laden air leaves the top of tower 3 through conduit 14 and is forwarded to absorber 15, wherein the iodine is separted from the air by means known to the art. For instance the iodine-laden air may be passed through a body of active charcoal to remove the iodine by adsorption on such charcoal, or the air stream may be scrubbed with a solution of an agent capable of combining chemically with the iodine, such as an alkali or sulphurous acid.

In practice we may introduce, for example, about 90 per cent of the air at the base of the tower, and about 10 per cent at the intermediate inlet. Thus, when 10 volumes of a 1/1000 chlorine-air mixture is introduced at the intermediate inlet, it mixes with about 90 volumes of air introduced at the base, forming a highly diluted chlorine-air mixture containing about 1 volume of chlorine to 10,000 volumes of air. In such dilution the chlorine is substantially all dissolved in the brine in oxidizing zone 4, while avoiding excessive localized chlorine concentration, so that the possibility of over-oxidation of any of the liberated iodine is reduced to a minimum. Thus conditions are created which are favorable to the greatest degree of liberation and vaporization of free iodine with the least possible over-oxidation of iodine to iodic acid. Other conditions being the same, losses of iodine in the waste brine, due to formation of water-soluble iodine compounds by hydrolysis and over-oxidation, may be reduced to a negligible amount by means of the above improved procedure. By proceeding in the manner just described for processing an oil field brine containing, say, from 60 to 150 parts per million of iodine, we have been able to reduce the content of combined iodine in the waste brine, under otherwise parallel conditions, from as high as 10 or 12 parts per million to as low as 2 parts per million, while at the same time lowering the acidity of the treated brine from a pH value of between 2 and 3 to a value between 5 and 7.

Various modifications of the herein described procedure may be used, as will be evident, without departing from the principle of the invention. For instance, a separate oxidation tower may be used in conjunction with the usual blowing-out tower of the prior art processes. In such case the concentration of chlorine in the air-chlorine mixture used for the oxidation is independent of the volume of air required for blowing out the liberated iodine, and higher chlorine concentrations may be used than would be possible in the procedure described above, wherein a single tower is used for both the oxidation and blowing-out of the iodine. In general, however, the concentration of chlorine in the air-chlorine mixture should not exceed about 0.1 per cent by volume. In the latter case, of course, the volume of air used in the oxidizing step would be much less than that in the blowing-out step. When a separate oxidation tower is used, the exit air stream therefrom, containing a portion of the liberated iodine, may be conducted directly to the absorber to separate the iodine vapors, while the oxidized brine is passed to a conventional blowing-out tower for vaporizing and removing the remainder of the free iodine, the air stream therefrom being likewise conducted to the absorber.

The advantages of the process of the invention for extracting iodine from natural brines and the like are not realized in the same degree by adapting a similar method to the production of bromine from natural brines, sea water or the like. This is due to the fact that hydrolysis of bromine by water takes place much more rapidly and to a greater degree, while on the other hand the tendency to over-oxidation of bromine is much less. Consequently it has not been found feasible in similar fashion to reduce the acidity of the oxidized brine below the point used in known processes of the same general character for the extraction of bromine, in which a pH value between about 4 and 5 is commonly used. Our invention, however, is well adapted for use in a combination process for extracting iodine and bromine successively from a natural brine containing both halogens in combined form, inasmuch as brines containing iodine often have an equal or greater content of bromine. In such combination process the iodine is first extracted in the manner already described, the raw brine in this case being acidified to a pH value preferably between 4 and 5. The waste brine from the iodine extraction, which still contains the dissolved bromine compounds, is then processed to extract the bromine, whereby it is oxidized further, by chlorination or otherwise, to liberate bromine therein, and the bromine recovered by blowing out with air and absorption from the bromine-laden air stream in the manner known to the art. By such procedure a single acidification of the original raw brine will suffice for the successive extraction of iodine and of bromine with a consumption of only a fraction of the quantity of mineral acid which prior art processes would have required.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. In a process for the extraction of iodine from a natural brine or the like, the steps which consist in adding chlorine to an air current in amount required to liberate the iodine content of the brine, and contacting such chlorine-laden air stream with the brine to liberate the iodine therein and simultaneously vaporize such liberated iodine.

2. In a process for the extraction of iodine from a natural brine or the like, wherein such brine is treated to liberate iodine therein and the iodine removed by blowing out with a voluminous current of air, the steps which consist in causing the brine to flow in countercurrent to a current of air in two stages, in the first of which chlorine is added to the air stream in amount required to liberate the iodine in the brine, and in the second stage the brine from said first stage is contacted with the air stream prior to adding such chlorine thereto.

3. In a process of extracting iodine from a natural brine or the like, the steps which consist in causing the brine to flow in countercurrent to a current of air containing a minute proportion of chlorine to liberate the iodine and simultaneously vaporize a substantial proportion of such iodine, then passing the brine in contact with a current of air free from chlorine to vaporize the residual iodine therein.

4. In a process of extracting iodine from an alkaline brine, the steps which consist in acidifying the brine to a pH value between 5 and 7, causing the acidified brine to flow in countercurrent to a current of air containing a minute proportion of chlorine to liberate the iodine and simultaneously vaporize a substantial proportion of such iodine, then passing the brine in contact with a current of air free from chlorine to vaporize the residual iodine therein.

5. In a process of extracting iodine from an alkaline brine, the steps which consist in acidifying the brine to a pH value between 5 and 7, causing the acidified brine to flow in countercurrent to a current of air containing between 0.1 and 0.001 per cent of chlorine by volume to liberate the iodine and simultaneously vaporize a substantial proportion of such iodine, then passing the brine in contact with a current of air free from chlorine to vaporize the residual iodine therein.

6. A process of extracting iodine from a solution containing an iodide which comprises liberating and simultaneously vaporizing a substantial proportion of such iodine by intimately contacting such solution with an air current containing a minute amount of chlorine and vaporizing the residual free iodine in the brine by similarly contacting with an air current free from chlorine.

7. The process defined in claim 6, in which chlorine is added in minute amount to the air current used in the second step thereof to produce the chlorine-laden air current used in the first step thereof.

8. A process of extracting iodine from an iodiferous brine which comprises producing in the brine a hydrogen ion concentration expressed by a pH value between 5 and 7.5, causing the brine to flow in intimate contact with and countercurrent to a voluminous current of air containing between 0.1 and 0.001 per cent of chlorine by volume, whereby to liberate the iodine in the brine and vaporize a substantial proportion thereof, then similarly contacting the brine with a current of air free from chlorine, adding the chlorine to the air current from the last mentioned step and employing such chlorine-laden air current in the preceding step.

9. In a process of extracting iodine from a solution containing an iodide, the step which consists in simultaneously oxidizing such solution and vaporizing iodine therefrom by intimately contacting the solution with a voluminous current of chlorine-laden air containing about 0.1 to 0.001 per cent of chlorine by volume.

10. In a process of extracting iodine from a solution containing an iodide, the steps which consist in simultaneously oxidizing such solution and vaporizing iodine therefrom by intimately contacting the solution with a voluminous current of chlorine-laden air containing about 0.1 to 0.001 per cent of chlorine by volume, then passing the solution in intimate contact with a current of chlorine-free air, adding chlorine to the air current from said second step and employing such chlorine-laden air in said first step.

11. In a process of extracting iodine and bromine successively from an alkaline brine containing the same, the steps which consist in acidifying such brine to a pH value between 4 and 5, intimately contacting the brine with an air current containing a minute amount of chlorine in proportion required to liberate the iodine in the brine and simultaneously vaporizing a substantial proportion of such iodine, passing the brine in intimate contact with a chlorine-free air current to vaporize residual iodine therefrom, adding chlorine to the air stream from said last mentioned step and employing the chlorine-laden air in the preceding step, oxidizing the iodine-free brine to liberate bromine therein, vaporizing and separating the bromine by blowing out with a current of air.

12. In a process of oxidizing an iodiferous brine to liberate free iodine therein, the steps which consist in intimately contacting the brine with an air stream to which from 0.010 to 0.003 per cent by volume of chlorine has been added, whereby to liberate the iodine and vaporize a portion thereof, then similarly contacting the oxidized brine with the same air stream prior to addition of chlorine thereto, to vaporize and remove the remainder of the free iodine.

SHELDON B. HEATH.
FRANK A. LANDEE.